| (12) | United States Patent<br>Krey et al. | (10) Patent No.: US 11,807,365 B2<br>(45) Date of Patent: Nov. 7, 2023 |
|---|---|---|

(54) WING FOR AN AIRCRAFT WITH ROLLING SLAT CONNECTION ASSEMBLY

(71) Applicant: Airbus Operations GmbH, Hamburg (DE)

(72) Inventors: Dennis Krey, Hamburg (DE); Alexander Huber, Hamburg (DE); Bernhard Schlipf, Hamburg (DE); Florian Lorenz, Hamburg (DE)

(73) Assignee: AIRBUS OPERATIONS GmbH, Hamburg (DE)

( * ) Notice: Subject to any disclaimer, the term of this patent is extended or adjusted under 35 U.S.C. 154(b) by 0 days.

(21) Appl. No.: 17/581,745

(22) Filed: Jan. 21, 2022

(65) Prior Publication Data

US 2022/0234723 A1 Jul. 28, 2022

(30) Foreign Application Priority Data

Jan. 22, 2021 (DE) ...................... 10 2021 101 443.3

(51) Int. Cl.
*B64C 9/22* (2006.01)
*B64C 9/02* (2006.01)

(52) U.S. Cl.
CPC . *B64C 9/22* (2013.01); *B64C 9/02* (2013.01)

(58) Field of Classification Search
CPC .................................. B64C 9/02; B64C 9/22
See application file for complete search history.

(56) References Cited

U.S. PATENT DOCUMENTS

| 3,645,203 A * | 2/1972 | Slavic ..................... B41F 13/04 |
|---|---|---|
| | | 101/228 |
| 10,822,072 B2 | 11/2020 | Schlipf et al. |
| 2009/0127402 A1 | 5/2009 | Jaggard et al. |
| 2014/0209734 A1* | 7/2014 | Okabe ...................... B64C 9/22 |
| | | 244/99.3 |

(Continued)

FOREIGN PATENT DOCUMENTS

| EP | 3 299 278 | 3/2018 |
|---|---|---|
| EP | 3 395 679 | 10/2018 |

(Continued)

OTHER PUBLICATIONS

German Search Report of DE 10 2021 101 443.3 dated Aug. 26, 2021, 6 pages.

(Continued)

*Primary Examiner* — Brady W Frazier
*Assistant Examiner* — Shanna Danielle Glover
(74) *Attorney, Agent, or Firm* — Nixon & Vanderhye P.C.

(57) ABSTRACT

A wing for an aircraft is disclosed having a main wing, a slat, and a connection assembly movable connecting the slat to the main wing, wherein the connection assembly includes an elongate slat track, wherein the front end of the slat track is mounted to the slat, wherein the rear end and the intermediate portion of the slat track are mounted to the main wing by a roller bearing comprising a guide rail mounted to the main wing and a first roller unit mounted to the rear end of the slat track and engaging the guide rail, and wherein the roller bearing includes a second roller unit mounted to the main wing and engaging an engagement surface at the intermediate portion of the slat track.

15 Claims, 9 Drawing Sheets

(56) References Cited

U.S. PATENT DOCUMENTS

2016/0083081 A1* 3/2016 Cowles, Jr. ............. F16C 17/10
                                                                                             384/570
2020/0122819 A1    4/2020  Schlipf et al.
2020/0307769 A1  10/2020  Lorenz et al.

FOREIGN PATENT DOCUMENTS

| WO | 2018/197265 | 11/2018 |
| WO | 2018/197649 | 11/2018 |
| WO | 2019/0154698 | 8/2019 |

OTHER PUBLICATIONS

Extended European Search Report for Application No. EP 22152061.2, eight pages, dated Jun. 10, 2022.

* cited by examiner

WING FOR AN AIRCRAFT WITH ROLLING SLAT CONNECTION ASSEMBLY

CROSS REFERENCE TO RELATED APPLICATION

This application claims priority to and incorporates by reference German Application Number DE 10 2021 101 443.3, filed Jan. 22, 2021.

BACKGROUND

1. Field of the Invention

The present invention relates to a wing for an aircraft having a main wing, a slat, and a connection assembly movable connecting the slat to the main wing, such that the slat is movable between a retracted position and at least one extended position. Further aspects of the invention relate to an aircraft comprising such a wing and to a connection assembly as used in such a wing.

2. Description of Related Art

The connection assembly comprises an elongate slat track that extends along a track longitudinal axis between a front end and a rear end and has an intermediate portion between the front and rear ends. The front end of the slat track may be fixedly mounted to the slat, e.g. by two spherical bearings, both arranged with an offset in a wing profile plane across a wing span direction. The rear end and the intermediate portion of the slat track are movably mounted to the main wing by a roller bearing such that the slat track is movable along the track longitudinal axis, i.e. along a predefined path, which may be a circular path.

The roller bearing comprises a guide rail fixedly mounted to the main wing and a first roller unit mounted to the rear end of the slat track and engaging the guide rail. The guide rail may be formed, e.g. by a c-shape, such that its surfaces lie opposite the circumferential surface of the first roller unit, wherein the distance between an upper surface and a lower surface of the guide rail is larger than a diameter of the first roller unit, so that the first roller unit may engage only either the upper surface or the lower surface of the guide rail at the same time. I.e., the distance between upper and lower surfaces of the guide rail is selected such that a clearance is provided between the first roller unit and either the upper surface or the lower surface of the guide rail, so that the first roller unit cannot engage with the upper and lower surfaces of the guide rail at the same time and thereby block the first roller unit. Furthermore, the first roller unit has a first axis of rotation extending in parallel to a wing span direction, to a leading edge of main wing, or to a leading edge of the slat.

The roller bearing comprises a second roller unit that is fixedly mounted to the main wing and that engages an engagement surface provided at the intermediate portion of the slat track. The second roller unit may have a second axis of rotation extending in parallel to the wing span direction, to the leading edge of main wing, or to the leading edge of the slat.

Such wings are known in the art, for example from WO 2018/197649 A1, where a certain play between the first and second roller units and the corresponding contact surfaces at the guide rail and the slat track is provided to ensure operability of the slat track under wing deformation, loads, thermal extension and due to manufacturing tolerances.

SUMMARY

A wing is disclosed having reduced play during movement of the slat between retracted and extended positions.

The roller bearing comprises a play-reduction roller unit. The play-reduction roller unit urges the first roller unit in contact with the guide rail to avoid play between the first roller unit and the guide rail. Additionally or alternatively, the play-reduction roller unit urges the second roller unit in contact with the engagement surface to avoid play between the second roller unit and the engagement surface. "Contact" in this connection may be continuous contact during deployment of the slat, i.e. during movement of the slat track along the roller bearing between the retracted and extended positions of the slat. The play-reduction roller unit might be formed by a single roller element or by two or more roller elements, and may be rotating about a play-reduction axis of rotation parallel to the first and second axes of rotation of the first and second roller unit.

By such a play reduction, precision of the slat setting positions, i.e. the retracted position and the at least one extended position, is increased. Further, the play reduction reduced wear on the slat track, on the guide rail, and on the first and second roller units. Also, undesired vibration is avoided.

According to an exemplary embodiment, the slat track has a profile, i.e. a cross section across the longitudinal axis, comprising an upper flange portion, a lower flange portion and at least one web portion connecting upper and lower flange portions. Such a profile might be e.g. a C-profile, a double-C-profile, an I-profile, an H-profile, or a Π-profile. The second roller unit is arranged in a recess between upper and lower flange portions and engages the engagement surface provided at the upper flange portion and/or at the lower flange portion, for example, either the upper flange portion or the lower flange portion or both flange portions in a successive manner. In such a way, the second roller unit does not occupy the space above and below the slat track, and the slat track can be held with only a single roller element. This simplifies the connection assembly, saves space and weight, and thus increases efficiency of the wing. Further, the connection assembly can be formed such that it is arranged entirely in front of the front spar of the associated wing and does not penetrate the front spar.

In particular, the slat track has such a profile, in particular an I-profile or double-C-profile, that a first recess is formed between the upper and lower flange portions at a first side of the web portion, and a second recess is formed between the upper and lower flange portions at a second side of the web portion opposite the first side. In such a way, two roller elements can be received in both recesses.

The second roller unit may comprise a first roller element and a second roller element. The first roller element is arranged in the first recess and the second roller element is arranged in the second recess. First and second roller elements are arranged coaxially, i.e. both rotate about the second axis of rotation, and have the same radius. By the first and second roller element higher loads can be absorbed and a symmetric arrangement or an arrangement with two separate load paths is enabled.

According to an exemplary embodiment, the play-reduction roller unit is rotatably mounted to the main wing and rotatably, by its circumferential surface, engages a surface of the slat track. When the play-reduction roller unit is mounted to the main wing and engages the slat track, several different positions are possible which can all cause efficient play reduction.

In particular, the play-reduction roller unit, may centrally, at the intermediate portion, engage an upper surface of the slat track, or may engage an upper surface of the upper flange portion of the slat track, in such a way that the play-reduction roller unit urges the first roller unit in contact with an upper rail surface of a lower rail part of the guide rail, and/or the second roller unit in contact with the engagement surface provided at a lower surface of the upper flange portion. In such a way, a very efficient play reduction is enabled.

The guide rail may be formed in a way of a slot including the lower rail part with the upper rail surface and an upper rail part with a lower rail surface opposite from the upper rail surface. In such a way, the first roller unit can be guided from opposite sides, i.e. from above and below.

Alternatively, the guide rail may be formed in a one-sided way including only the lower rail part with the upper rail surface, but not including any upper rail part with a lower rail surface opposite from the upper rail surface. This means, by providing the play-reduction roller unit, the upper rail part can be saved, whereby weight and costs can be reduced.

Alternatively, the play-reduction roller unit, may centrally, at the intermediate portion, engage a lower surface of the slat track, or may engage a lower surface of the lower flange portion of the slat track, in such a way that the play-reduction roller unit urges the first roller unit in contact with a lower rail surface of an upper rail part of the guide rail, and/or the second roller unit in contact with the engagement surface provided at an upper surface of the lower flange portion. In such a way, a further very efficient play reduction is enabled.

Alternatively, the play-reduction roller unit may engage the engagement surface provided at a lower surface of the upper flange portion in such a way that the play-reduction roller unit urges the second roller unit in contact with the engagement surface provided at an upper surface of the lower flange portion. In such a way, a further very efficient play reduction is enabled.

According to an exemplary embodiment, the play-reduction roller unit is mounted rotatably to the slat track and rotatably, by its circumferential surface engages a surface of the guide rail. In such a way, very efficient play reduction is enabled without the play-reduction roller unit needing to be mounted to the main wing.

In particular, the play-reduction roller unit may engage a lower rail surface of an upper rail part in such a way that the play-reduction roller unit urges the first roller unit in contact with an upper rail surface of a lower rail part opposite from the lower rail surface of the upper rail part. In such a way, a further very efficient play reduction is enabled.

According to an exemplary embodiment, the web portion of the slat track comprises a slot extending from the first side to the second side of the web portion and extending elongated along the track longitudinal axis. The slot may extend along the track longitudinal axis at least as long as the distance by which the slat is moved between the retracted and a fully extended position. The first roller element and the second roller element are mounted on one common shaft for common rotation. The common shaft proceeds through the slot from the first side to the second side of the web portion. The opposite ends of the common shaft may be supported at the main wing. By using one common shaft to support first and second roller elements bending loads introduced in the main wing structure are minimized.

According to an exemplary embodiment, the first roller element is mounted on a first shaft and the second roller element is mounted on a second shaft separate from the first shaft. The first and second shafts may be independently supported at the main wing. By using separate shafts to support first and second roller elements no slot through the slat track is required.

According to an exemplary embodiment, the first roller unit comprises a single third roller element, may be mounted to the slat track by a yoke-shaped rear end of the slat track that holds the third roller element from opposite sides. Using only a single third roller element represents a very simple design.

In an alternative embodiment, the first roller unit comprises a third roller element and a fourth roller element. Third and fourth roller elements are arranged coaxially, i.e. both rotating about the first axis of rotation, and have the same radius. The third roller element may be arranged at the first side and the fourth roller element is arranged at the second side of the web portion. In such a way, a backup roller element is provided.

According to an exemplary embodiment, the slat track comprises a first track part and a second track part that are formed separate from one another. Each of the first and second track parts is formed integrally and extends along the track longitudinal axis from the rear end to the front end. The first and second track parts are mounted to one another, e.g. by bolts, and rest against one another along a contact plane spanned by the track longitudinal axis and a wing thickness direction, which might be a vertical symmetry plane, preferably along the entire longitudinal extension. By the first and second track part two separate load paths are introduced which might be designed as redundant load paths such that when one load path fails the other load path is still capable of carrying the occurring air loads applied via the slat.

In particular, the third roller element may be mounted to both the first track part and the second track part. In such a way, in case of failure of one of the first and second track parts the third roller element would still be sufficiently supported by the other one of the first and second track parts, so that this track part would still be guided by the third roller element.

Alternatively, the third roller element may be mounted to the first track part and the fourth roller element is mounted to the second track part. In such a way, in case of failure of one of the first and second track portions the other one of the first and second track portions would still be guided by the associated one of the third and fourth rollers.

According to an exemplary embodiment, the play-reduction roller unit is mounted to the main wing or to the slat track via an eccentric member, in particular an eccentric shaft or an eccentric sleeve, configured for adjusting the position of the play-reduction roller unit, in particular the position of the play reduction axis of rotation and/or a circumferential roller surface of the play-reduction roller unit, with respect to the slat track or the guide rail. The eccentric member may be formed as an eccentric shaft having a first shaft portion and a second shaft portion eccentric with respect to the first shaft portion.

The first shaft portion is mounted to the main wing or to the slat track, preferably to at least one leading edge rib of the main wing, rotatably about a rigging axis of rotation. The second shaft portion carries the play-reduction roller unit in a way that the play reduction axis of rotation is spaced apart from the rigging axis of rotation. In such a way, when the first shaft portion is rotated about the rigging axis of rotation, the second shaft portion together with the play reduction axis of rotation and the play-reduction roller unit rotate about the rigging axis of rotation in an eccentric manner, so that the distance of the roller surface of the play-reduction roller unit relative to the slat track and the guide rail, respectively, preferably relative to the slat track, in particular, relative to the upper surface of the upper flange portion of the slat track, can be adjusted by rotating the first shaft portion about the rigging axis of rotation.

A locking member may be provided for locking the first shaft portion in a fixed angular position relative to the main wing and the slat track, respectively, preferably relative to at least one leading edge rib, thereby locking the roller surface in a fixed position or distance relative to the upper surface of the upper flange portion. The locking member might comprise e.g. a toothed lock bar engaging a toothed outer surface of the first shaft portion. By such an eccentric member the position of the play reduction roller relative to the slat track and the guide rail, respectively, and thus the amount of play reduction applied, can be precisely adjusted.

According to yet a further embodiment, the connection assembly is a first connection assembly. The wing comprises a second connection assembly connecting the slat to the main wing in a position spaces apart from the first connection assembly in a wing span direction. The second connection assembly is formed as the first connection assembly, i.e. has the same features as the first connection assembly. Alternatively, the second connections assembly might also be formed different from the first connection assembly.

The present disclosure relates to an aircraft comprising a wing according to any of the afore-described embodiments. The features and advantages mentioned in connection with the wing also apply for the aircraft.

The present disclosure also relates to a connection assembly for movably connecting a slat to a main wing for an aircraft, as described above in connection with the wing. The connection assembly comprises an elongate slat track that extends along a track longitudinal axis between a front end and a rear end and has an intermediate portion between the front and rear ends. The front end of the slat track is configured to be mounted to the slat. The rear end and the intermediate portion of the slat track are configured to be mounted to the main wing by a roller bearing such that the slat track is movable along the track longitudinal axis. The roller bearing comprises a guide rail configured to be mounted to the main wing, and a first roller unit mounted to the rear end of the slat track and configured for engaging the guide rail. The roller bearing comprises a second roller unit that is configured to be mounted to the main wing and that is configured for engaging an engagement surface provided at the intermediate portion of the slat track. The roller bearing comprises a play-reduction roller unit configured for urging the first roller unit in contact with the guide rail and/or configured for urging the second roller unit in contact with the engagement surface. The features and advantages mentioned in connection with the wing also apply for the connection assembly that can be used in such a wing.

BRIEF DESCRIPTION OF THE DRAWINGS

For an understanding of embodiments of the disclosure, reference is now made to the following description taken in conjunction with the accompanying drawings, in which.

DETAILED DESCRIPTION OF SOME EMBODIMENTS

Some embodiments will now be described with reference to the Figures.

Figure 1:
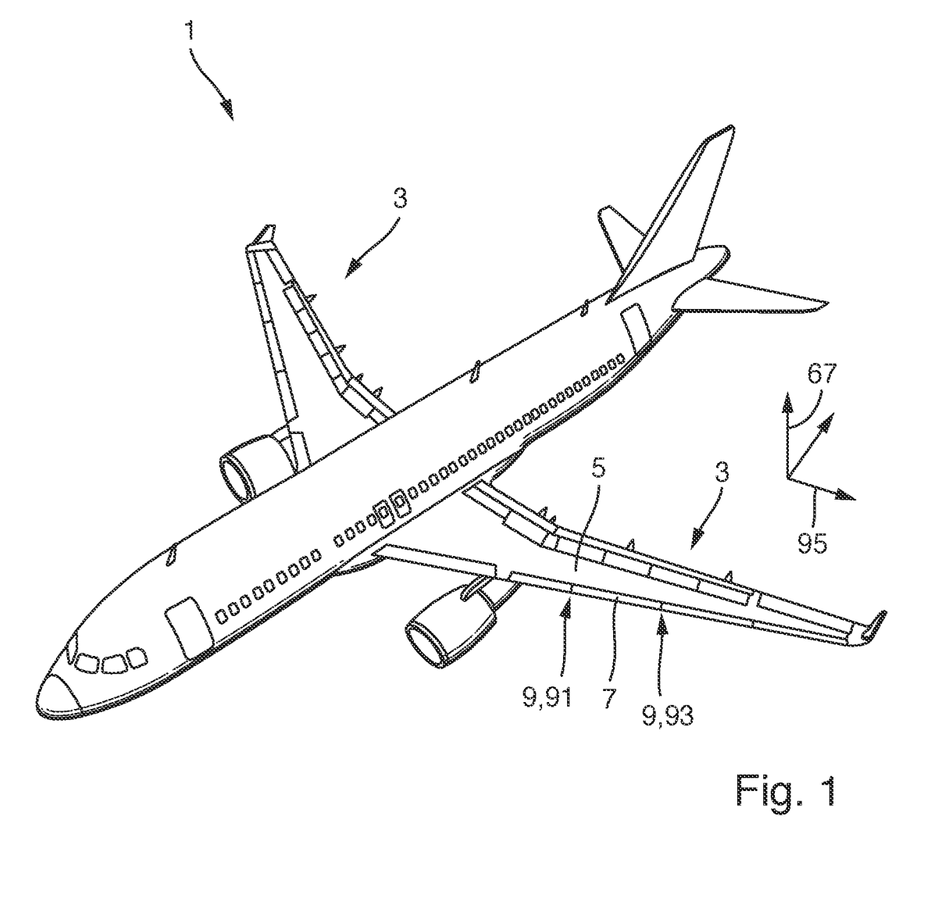
FIG. 1 is a perspective view of an aircraft according to the present invention, including a wing.

In FIG. 1 an aircraft 1 according to an embodiment of the present invention is illustrated. The aircraft 1 comprises a wing 3 that is formed according to an embodiment of the present invention.

Figure 2:
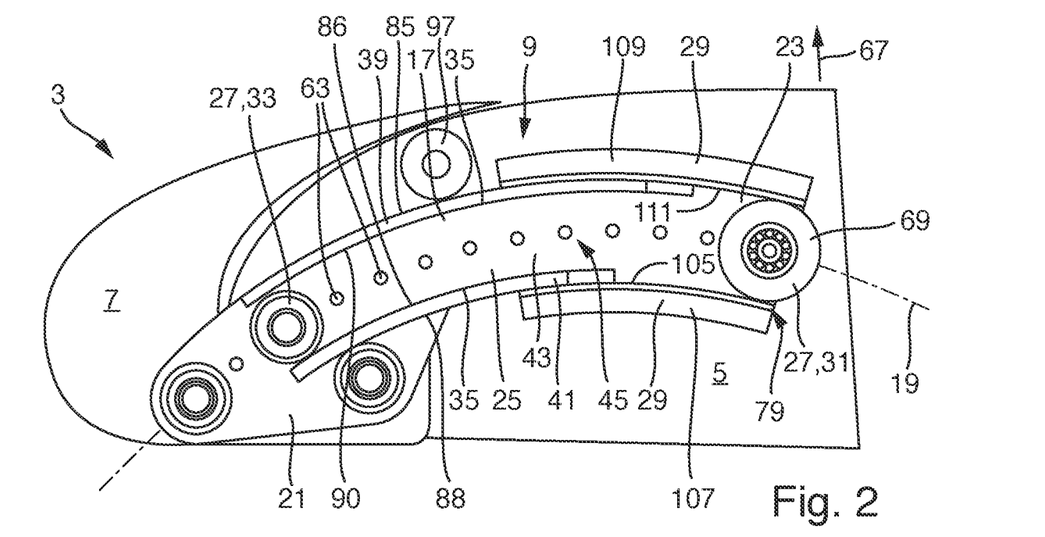
FIG. 2 is a cross sectional view of the wing shown in FIG. 1, including a connection assembly according to a first embodiment of the invention.

FIG. 2 shows the wing 3 from FIG. 1 in more detail. The wing 1 comprises a main wing 5, a slat 7, and a connection assembly 9 movable connecting the slat 7 to the main wing 5, such that the slat 7 is movable between a retracted position 11 and at least one extended position 13, 15.

The connection assembly 9 comprises an elongate slat track 17 that extends along a track longitudinal axis 19 between a front end 21 and a rear end 23 and has an intermediate portion 25 between the front and rear ends 21, 23. The front end 21 of the slat track 17 is fixedly mounted to the slat 7. The rear end 23 and the intermediate portion 25 of the slat track 17 are movably mounted to the main wing 5 by a roller bearing 27 such that the slat track 17 is movable along the track longitudinal axis 19. The connection assembly 9 further comprises a guide rail 29 fixedly mounted to the main wing 5 and a first roller unit 31 fixedly mounted to the rear end 23 of the slat track 17 and engaging the guide rail 29. The roller bearing 27 comprises a second roller unit 33 that is fixedly mounted to the main wing 5 and that engages an engagement surface 35 provided at the intermediate portion 25 of the slat track 17.

Figure 3:
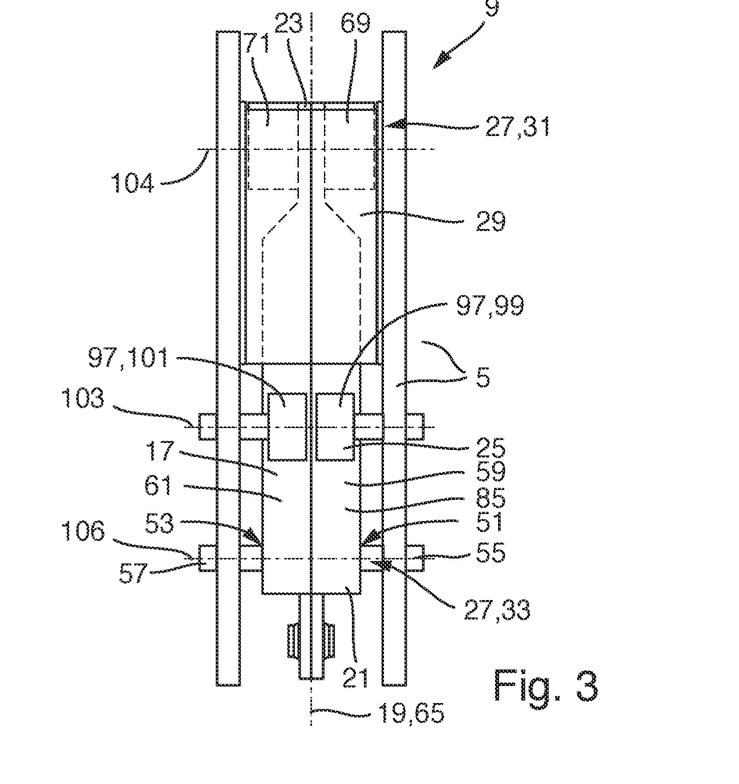
FIG. 3 is a top view of the connection assembly shown in FIG. 2.
Figure 4:
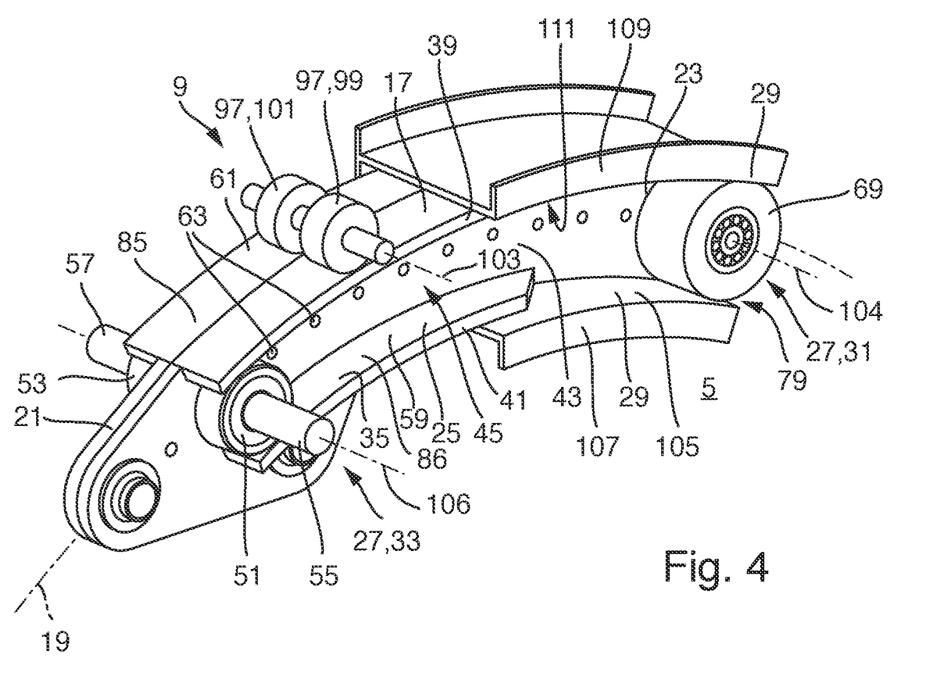
FIG. 4 is a perspective view of the connection assembly shown in FIG. 2.
Figure 5:
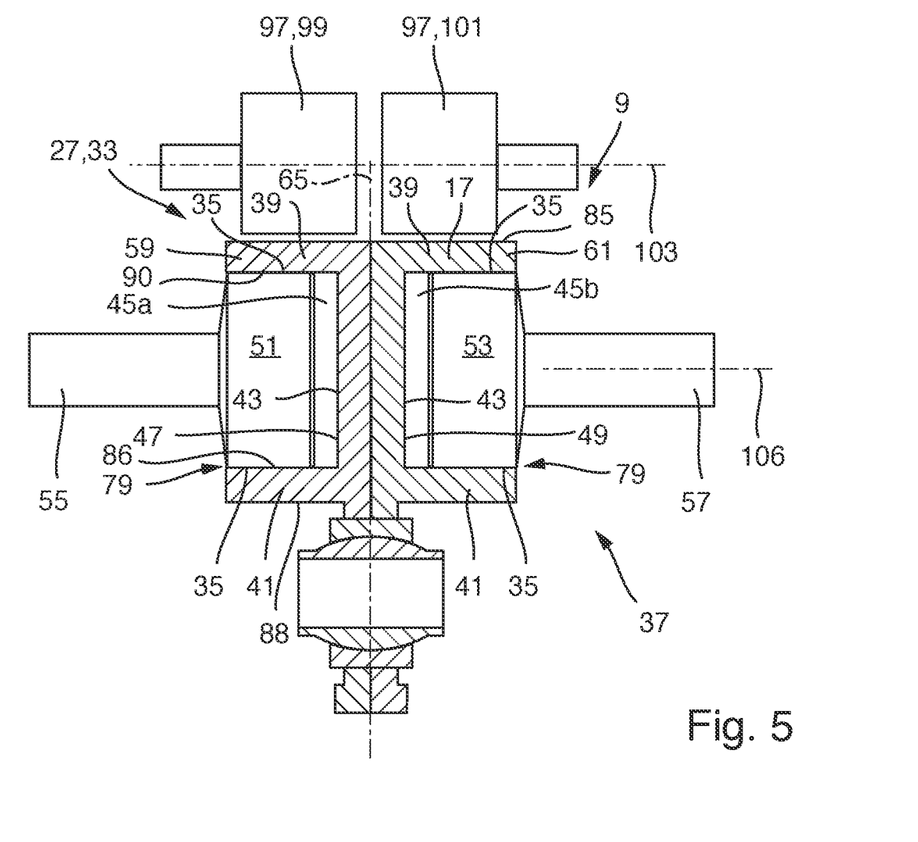
FIG. 5 is a cross sectional view across the track longitudinal axis of the connection assembly shown in FIG. 2.

As shown in FIGS. 3-5, the slat track 17 has a double-C-shaped profile 37 comprising an upper flange portion 39, a lower flange portion 41 and at least one web portion 43 connecting upper and lower flange portions 39, 41. The second roller unit 33 is arranged in a recess 45 between upper and lower flange portions 39, 41 and engages the engagement surface 35 provided at the upper flange portion 39 and at the lower flange portion 41.

As shown in FIGS. 4 and 5, the double-C-shaped profile 37 of the slat track 17 provides that a first recess 45a is formed between the upper and lower flange portions 39, 41 at a first side 47 of the web portion 43, and a second recess 45b is formed between the upper and lower flange portions 39, 41 at a second side 49 of the web portion 43 opposite the first side 47. The second roller unit 33 comprises a first roller element 51 and a second roller element 53. The first roller element 51 is arranged in the first recess 45a and the second roller element 53 is arranged in the second recess 45b.

First and second roller elements 51, 53 are arranged coaxially and have the same radius. The first roller element 51 is mounted on a first shaft 55 and the second roller element 53 is mounted on a second shaft 57 separate from the first shaft 55. First and second shafts 55, 57 are independently supported at the main wing 5.

FIGS. 3-5 show that the slat track 17 comprises a first track part 59 and a second track part 61 that are formed separate from one another. Each of the first and second track parts 59, 61 is formed integrally and extends along the track longitudinal axis 19 from the rear end 23 to the front end 21.

The first and second track parts 59, 61 are mounted to one another by bolts 63 and rest against one another along a contact plane 65 spanned by the track longitudinal axis 19 and a wing thickness direction 67. As visible in FIG. 3, the first roller unit 31 comprises a third roller element 69 and a fourth roller element 71. Third and fourth roller elements 69, 71 are arranged coaxially and have the same radius. The third roller element 69 is mounted to the first track part 59 and the fourth roller element 71 is mounted to the second track part 61. Alternatively, the first roller unit 31 might also comprise only a single third roller element 69.

As shown in FIGS. 2 to 5, the roller bearing 27 comprises a play-reduction roller unit 97. The play-reduction roller unit 97 urges the first roller unit 31 in contact with the guide rail 29 to avoid play between the first roller unit 31 and the guide rail 29, and urges the second roller unit 33 in contact with the engagement surface 35 to avoid play between the second roller unit 33 and the engagement surface 35. In the embodiment shown in FIGS. 1 to 5, the play-reduction roller unit 97 comprises a first play-reduction roller element 99 and a second play-reduction roller element 101 arranged adjacently in a coaxial manner, so that they rotate about a single play-reduction axis of rotation 103 parallel to the first and second axes of rotation 104, 106 of the first and second roller units 31, 33. The first play-reduction roller element 99 contacts the first track part 59 while the second play-reduction roller element 101 contacts the second track part 61.

In the embodiments shown in FIGS. 2 to 5, the play-reduction roller unit 97 is mounted to the main wing 5 and engages a surface of the slat track 17 at the intermediate portion 25. Specifically, the play-reduction roller unit 97 engages an upper surface 85 of the upper flange portion 39 of the slat track 17, in such a way that the play-reduction roller unit 97 urges the first roller unit 31 in contact with an upper rail surface 105 of a lower rail part 107 of the guide rail 29, and in such a way that the play-reduction roller unit 97 urges the second roller unit 33 in contact with the engagement surface 35 provided at a lower surface 90 of the upper flange portion 39.

Furthermore, the guide rail 29 is formed in a way of a slot including the lower rail part 107 with the upper rail surface 105 and an upper rail part 109 with a lower rail surface 111 opposite from the upper rail surface 105.

Figure 6:
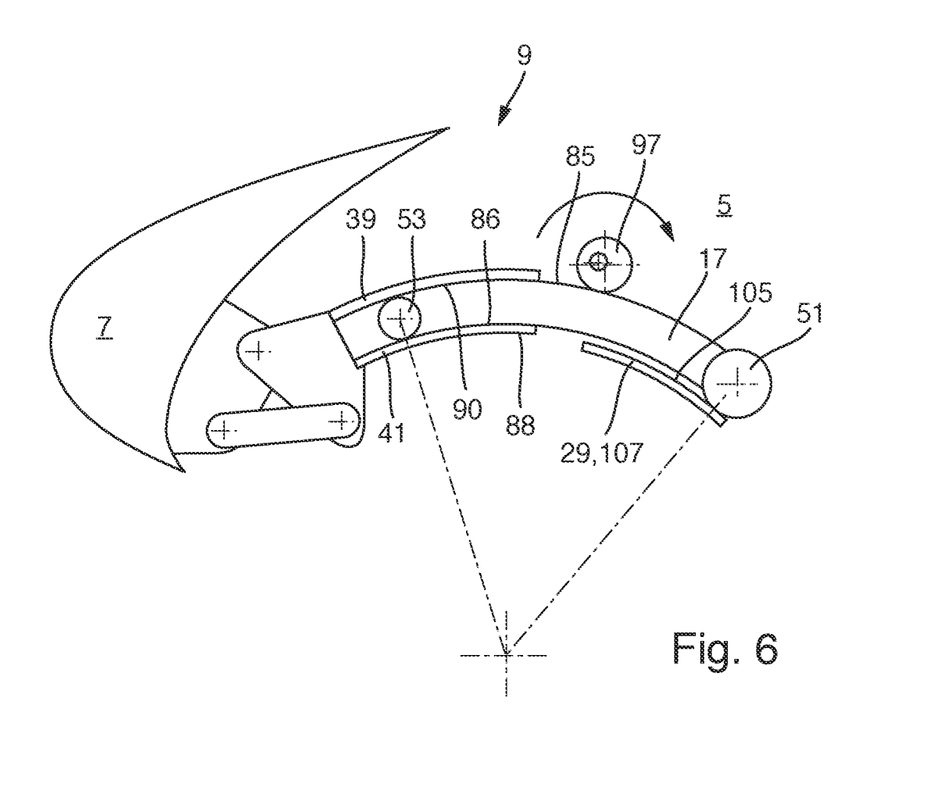
FIG. 6 is a side view of a connection assembly according to a second embodiment of the invention.

The embodiment shown in FIG. 6 differs from the embodiment shown in FIGS. 2 to 5 by the guide rail 29 being formed in a one-sided way including only the lower rail part 107 with the upper rail surface 105, but not including any upper rail part with a lower rail surface opposite from the upper rail surface.

Figure 7:
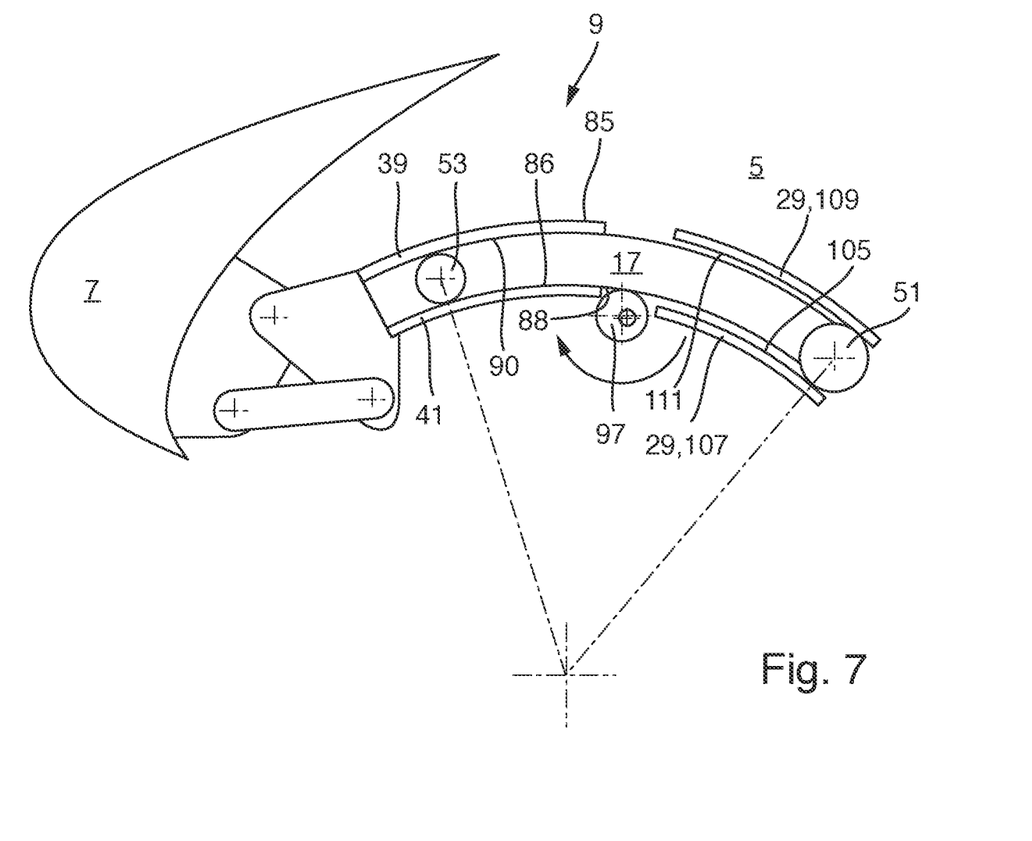
FIG. 7 is a side view of a connection assembly according to a third embodiment of the invention.

The embodiment shown in FIG. 7 differs from the embodiment shown in FIGS. 2 to 5 by the play-reduction roller unit 97 engaging a lower surface 88 of the lower flange portion 41 of the slat track 17, in such a way that the play-reduction roller unit 97 urges the first roller unit 31 in contact with a lower rail surface 111 of an upper rail part 109 of the guide rail 29, and in such a way that the play-reduction roller unit 97 urges the second roller unit 33 in contact with the engagement surface 35 provided at an upper surface 86 of the lower flange portion 41.

Figure 8:
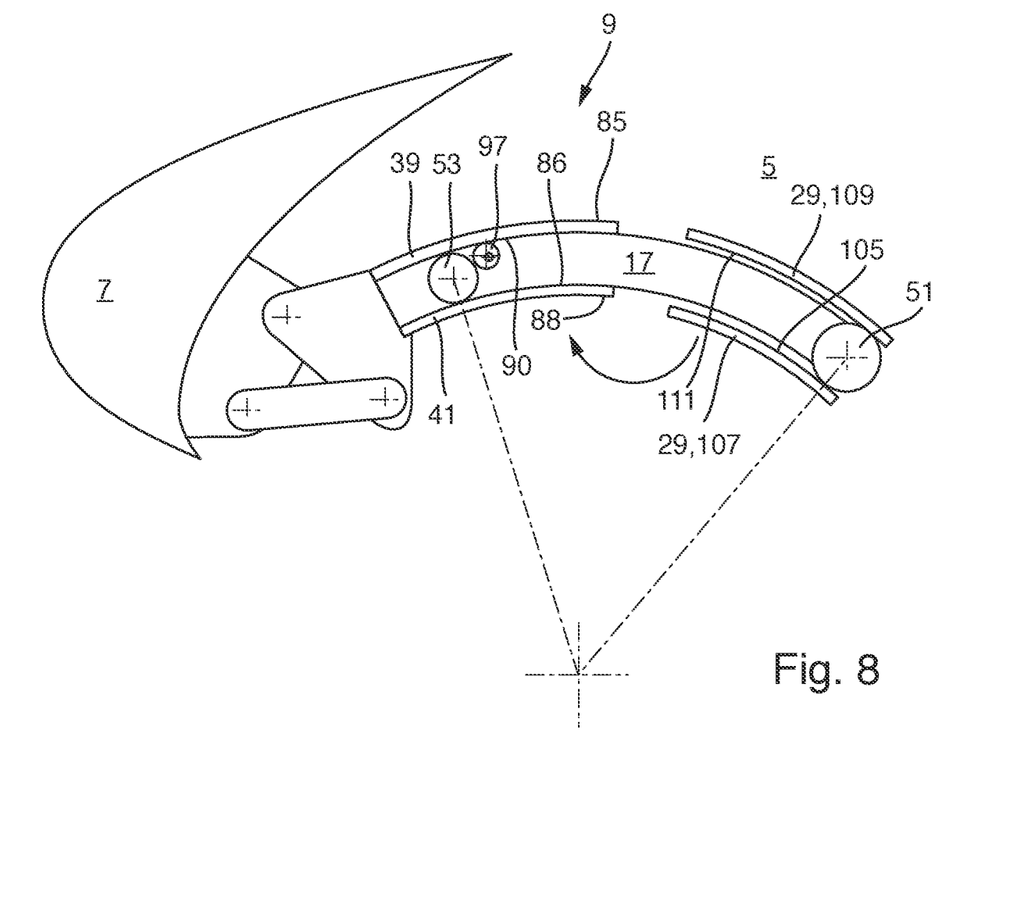
FIG. 8 is a side view of a connection assembly according to a fourth embodiment of the invention.

The embodiment shown in FIG. 8 differs from the embodiment shown in FIGS. 2 to 5 by the play-reduction roller unit 97 engaging the engagement surface 35 provided at a lower surface 90 of the upper flange portion 39 in such a way that the play-reduction roller unit 97 urges the second roller unit 33 in contact with the engagement surface 35 provided at an upper surface 86 of the lower flange portion 41.

Figure 9:
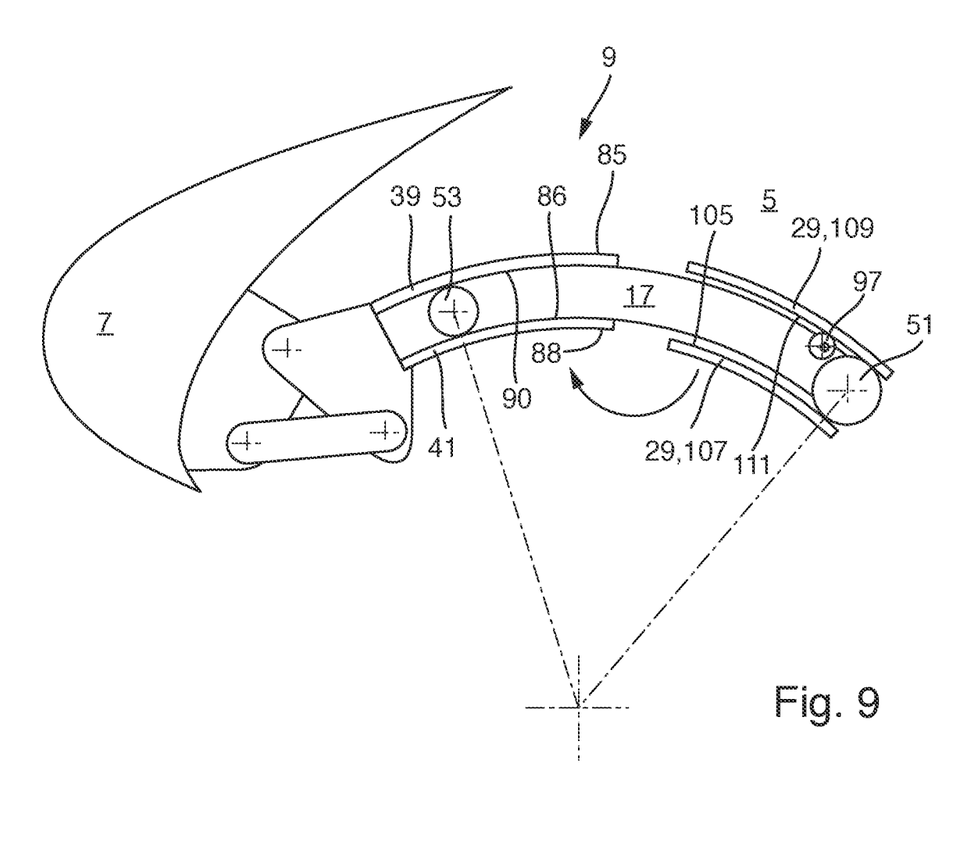
FIG. 9 is a side view of a connection assembly according to a fifth embodiment of the invention; and, FIG. 10 is a schematic top view of a sixth embodiment of the invention.

The embodiment shown in FIG. 9 differs from the embodiment shown in FIGS. 2 to 5 by the play-reduction roller unit 97 being mounted to the slat track 17 and engaging a surface of the guide rail 29. Specifically, the play-reduction roller unit 97 engages a lower rail surface 111 of an upper rail part 109 in such a way that the play-reduction roller unit 97 urges the first roller unit 31 in contact with an upper rail surface 105 of a lower rail part 107 opposite from the lower rail surface 111 of the upper rail part 109.

Figure 10:
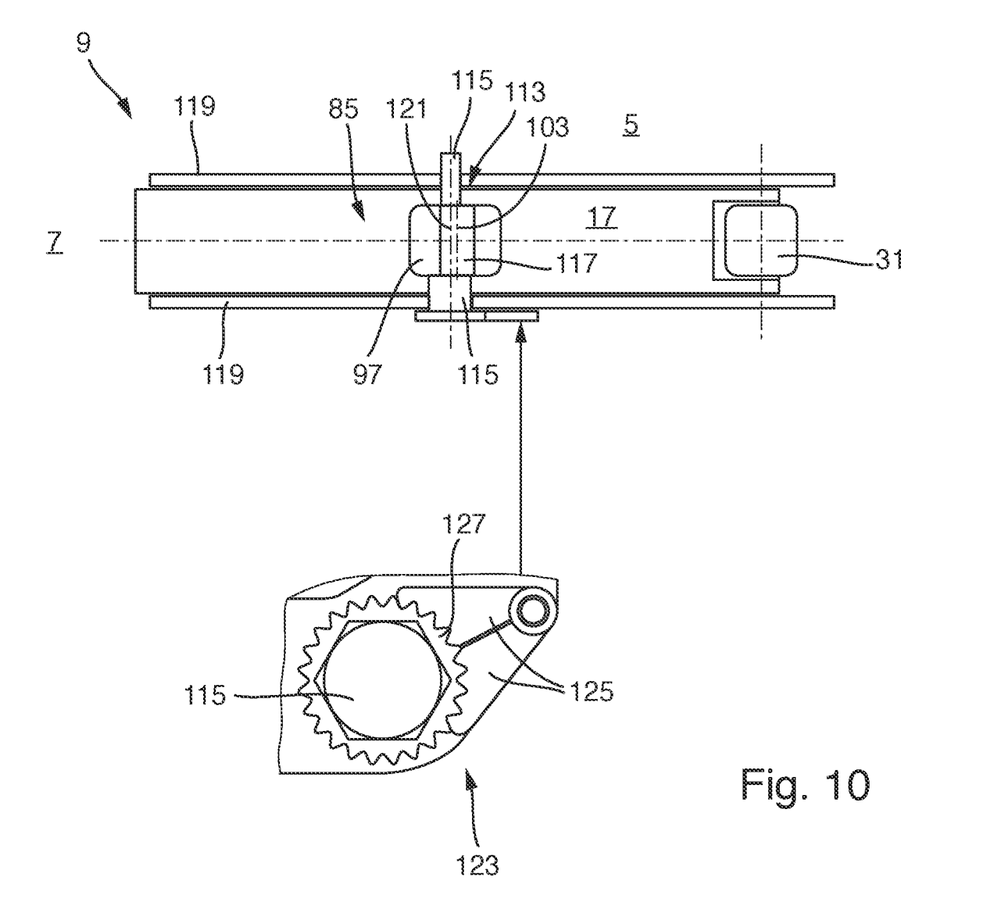

The embodiment shown in FIG. 10 differs from the embodiment shown in FIGS. 2 to 5 or from the embodiment shown in FIG. 6 by the play-reduction roller unit 97 being mounted to the main wing 5 via an eccentric member 113 configured for adjusting the position of the play-reduction roller unit 97, specifically the position of the play reduction axis of rotation 103 and a circumferential roller surface 115 of the play-reduction roller unit 97, with respect to the slat track 17. The eccentric member 113 is formed as an eccentric shaft having a first shaft portion 115 and a second shaft portion 117 eccentric with respect to the first shaft portion 115. The first shaft portion 115 is mounted to two adjacent leading edge ribs 119 of the main wing 5 rotatably about a rigging axis of rotation 121. The second shaft portion 117 carries the play-reduction roller unit 97 in a way that the play reduction axis of rotation 103 is spaced apart from the rigging axis of rotation 121.

In such a way, when the first shaft portion 115 is rotated about the rigging axis of rotation 121, the second shaft portion 117 together with the play reduction axis of rotation 103 and the play-reduction roller unit 97 rotate about the rigging axis of rotation 121 in an eccentric manner, so that the distance of the roller surface 115 of the play-reduction roller unit 97 relative to the upper surface 85 of the upper flange portion 39 of the slat track 17, can be adjusted by rotating the first shaft portion 115 about the rigging axis of rotation 121.

Furthermore, a locking member 123 is provided for locking the first shaft portion 115 in a fixed angular position relative to the leading edge ribs 119 of the main wing 5, thereby locking the roller surface 115 in a fixed position or distance relative to the upper surface 85. The locking member 123 comprises a toothed lock bar 125 engaging a toothed outer surface 127 of the first shaft portion 115.

As shown in FIG. 1, the connection assembly 9 is a first connection assembly 91, and the wing 3 comprises a second connection assembly 93 connecting the slat 7 to the main wing 5 in a position spaced apart from the first connection assembly 91 in a wing span direction 95, and wherein the second connection assembly 93 is formed as the first connection assembly 91.

The described embodiments of the present invention enable efficient play reduction during deployment of the slat 7. By such a play reduction, precision of the slat setting positions, i.e. the retracted position 11 and the at least one extended position 13, 15, is increased. Further, the play reduction reduced wear on the slat track 17, on the guide rail 29, and on the first and second roller units 31, 33. Also, undesired vibration is avoided.

While at least one exemplary embodiment is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wing for an aircraft, comprising;
a main wing,
a slat, and
a connection assembly movable connecting the slat to the main wing, such that the slat is movable between a retracted position and at least one extended position,
wherein the connection assembly comprises an elongate slat track that extends along a track longitudinal axis between a front end and a rear end and has an intermediate portion between the front and rear ends,
wherein the front end of the slat track is mounted to the slat,
wherein the rear end and the intermediate portion of the slat track are mounted to the main wing by a roller bearing assembly such that the slat track is movable along the track longitudinal axis,
wherein the connection assembly further comprises a guide rail mounted to the main wing,
and wherein the roller bearing assembly comprises a first roller unit mounted to the rear end of the slat track and engaging the guide rail, and
wherein the roller bearing assembly further comprises a second roller unit that is mounted to the main wing and that engages an engagement surface provided at the intermediate portion of the slat track,
wherein the roller bearing assembly further comprises a play-reduction roller unit formed by at least one roller element urging the first roller unit in contact with the guide rail and urging the second roller unit in contact with the engagement surface.

2. The wing according to claim 1, wherein the slat track has a profile comprising an upper flange portion, a lower flange portion and at least one web portion connecting upper and lower flange portions, and
the second roller unit is arranged in a recess between upper and lower flange portions and engages the engagement surface provided at the upper flange portion and/or at the lower flange portion.

3. The wing according to claim 2, wherein the recess includes a first recess formed between the upper and lower flange portions at a first side of the web portion, and a second recess formed between the upper and lower flange portions at a second side of the web portion opposite the first side.

4. The wing according to claim 3, wherein the second roller unit comprises a first roller element and a second roller element,
wherein the first roller element is arranged in the first recess and the second roller element is arranged in the second recess, and wherein first and second roller elements are arranged coaxially and have the same radius.

5. The wing according to claim 1, wherein the play-reduction roller unit is mounted to the main wing and engages the slat track.

6. The wing according to claim 5, wherein the play-reduction roller unit engages an upper surface of the slat track in such a way that the play-reduction roller unit urges the first roller unit in contact with an upper rail surface of a lower rail part of the guide rail, and/or the second roller unit in contact with the engagement surface provided at the upper flange portion.

7. The wing according to claim 6, wherein the guide rail is formed in a way of a slot including the lower rail part with the upper rail surface and an upper rail part with a lower rail surface opposite from the upper rail surface.

8. The wing according to claim 6, wherein the guide rail is formed in a one-sided way including only the lower rail part with the upper rail surface, but not including any upper rail part with a lower rail surface opposite from the upper rail surface.

9. The wing according to claim 5, wherein the play-reduction roller unit engages a lower surface of the upper flange of the slat track in such a way that the play-reduction roller unit urges the first roller unit in contact with a lower rail surface of an upper rail part of the guide rail, and/or the second roller unit in contact with the engagement surface provided at the lower flange portion.

10. The wing according to claim 5, wherein the play-reduction roller unit engages the engagement surface provided at the upper flange portion in such a way that the play-reduction roller unit urges the second roller unit in contact with the engagement surface provided at the lower flange portion.

11. The wing according to claim 1, wherein the play-reduction roller unit is mounted to the slat track and engages the guide rail.

12. The wing according to claim 11, wherein the play-reduction roller unit engages a lower rail surface of an upper rail part in such a way that the play-reduction roller unit urges the first roller unit in contact with an upper rail surface of a lower rail part.

13. The wing according to claim 1, wherein the play-reduction roller unit is mounted to the main wing or to the slat track via an eccentric member configured for adjusting the position of the play-reduction roller unit.

14. An aircraft comprising a wing according to claim 1.

15. A connection assembly for an aircraft wing having a main wing and a slat, wherein the connection assembly movably connects the slat to the main wing such that the slat is movable between a retracted position and at least one extended position, wherein the connection assembly comprises:
an elongate slat track that extends along a track longitudinal axis between a front end and a rear end and has an intermediate portion between the front and rear ends,
wherein the front end of the slat track is mounted to the slat,
wherein the rear end and the intermediate portion of the slat track are mounted to the main wing by a roller bearing assembly such that the slat track is movable along the track longitudinal axis,
wherein the connection assembly further comprises a guide rail mounted to the main wing, and wherein the roller bearing assembly comprises a first roller unit mounted to the rear end of the slat track and engaging the guide rail, and wherein the roller bearing assembly further comprises a second roller unit that is mounted to the main wing and that engages an engagement surface provided at the intermediate portion of the slat track, wherein the roller bearing assembly further comprises a play-reduction roller unit formed by at least one roller element urging the first roller unit in contact with the guide rail and urging the second roller unit in contact with the engagement surface.

* * * * *